(12) United States Patent
Johannsen

(10) Patent No.: US 12,063,281 B2
(45) Date of Patent: Aug. 13, 2024

(54) METHODS FOR CONTROLLING TRACKING ELEMENTS OF A WEB PAGE AND RELATED ELECTRONIC DEVICES

(71) Applicant: Usercentrics A/S, Copenhagen (DK)

(72) Inventor: Daniel Johannsen, Haarby (DK)

(73) Assignee: Usercentrics A/S, Copenhagen K (DK)

( * ) Notice: Subject to any disclaimer, the term of this patent is extended or adjusted under 35 U.S.C. 154(b) by 0 days.

(21) Appl. No.: 17/624,599

(22) PCT Filed: Jun. 24, 2020

(86) PCT No.: PCT/EP2020/067698
§ 371 (c)(1),
(2) Date: Jan. 4, 2022

(87) PCT Pub. No.: WO2021/004792
PCT Pub. Date: Jan. 14, 2021

(65) Prior Publication Data
US 2022/0256006 A1 Aug. 11, 2022

(30) Foreign Application Priority Data
Jul. 11, 2019 (EP) .................................... 19185844

(51) Int. Cl.
*H04L 67/50* (2022.01)
*G06F 16/955* (2019.01)
(Continued)

(52) U.S. Cl.
CPC ........ *H04L 67/535* (2022.05); *G06F 16/9566* (2019.01); *G06F 16/958* (2019.01); *H04L 67/025* (2013.01); *H04L 67/146* (2013.01)

(58) Field of Classification Search
CPC ... H04L 67/535; H04L 67/025; H04L 67/146; G06F 16/9566; G06F 16/958
See application file for complete search history.

(56) References Cited

U.S. PATENT DOCUMENTS 6,112,240 A 8/2000 Pogue
7,379,980 B1 * 5/2008 Gilbert .................... H04L 67/02
715/745

(Continued)

FOREIGN PATENT DOCUMENTS

WO 2011041465 A1 4/2011

OTHER PUBLICATIONS

Wikipedia, "Do Not Track", https://en.wikipedia.org/wiki/Do_Not_Track, accessed Feb. 2023 (Year: 2023).*

(Continued)

*Primary Examiner* — Ramy M Osman

(57) ABSTRACT

A method for controlling tracking elements of a web page is disclosed. The method is performed at an electronic device. The electronic device is configured to communicate to a server device and to a web server. The method comprises obtaining a web page address of the web page to connect to the web server. The method comprises transmitting a web page request to the web server based on the web page address. The method comprises receiving, from the web server, a web page response. The web page response comprises tracking elements. The web page response comprises a control tag configured to control tracking elements of the web page. The method comprises rendering the web page based on the web page response. Rendering the web page comprises invoking the control tag. Invoking the control tag comprises obtaining a first set of tracking tags of the web page.

12 Claims, 4 Drawing Sheets

(51) Int. Cl.
  *G06F 16/958* (2019.01)
  *H04L 67/025* (2022.01)
  *H04L 67/146* (2022.01)

(56) References Cited

U.S. PATENT DOCUMENTS

| | | | |
|---|---|---|---|
| 8,166,406 B1* | 4/2012 | Goldfeder | H04L 67/02 |
| | | | 709/224 |
| 8,370,475 B1* | 2/2013 | Harvey | H04L 67/02 |
| | | | 709/227 |
| 9,412,115 B2* | 8/2016 | Seolas | H04L 67/025 |
| 9,753,898 B1* | 9/2017 | Glommen | H04L 67/535 |
| 2011/0153796 A1 | 6/2011 | Branson | |
| 2012/0084349 A1* | 4/2012 | Lee | H04L 67/025 |
| | | | 709/203 |
| 2013/0212638 A1* | 8/2013 | Wilson | H04L 63/20 |
| | | | 726/1 |
| 2014/0280012 A1* | 9/2014 | Feuerlein | G06F 16/986 |
| | | | 707/709 |
| 2014/0281902 A1* | 9/2014 | Feuerlein | H04L 67/025 |
| | | | 715/234 |
| 2015/0302052 A1* | 10/2015 | Galarneau | H04L 67/146 |
| | | | 707/736 |
| 2020/0074009 A1* | 3/2020 | Marzorati | H04L 67/02 |
| 2021/0243262 A1* | 8/2021 | Dudmesh | H04L 67/535 |
| 2022/0222378 A1* | 7/2022 | Johannsen | H04L 63/168 |
| 2022/0256006 A1* | 8/2022 | Johannsen | H04L 67/535 |

OTHER PUBLICATIONS

Anonymous: "Google Tag Manager vs. Google Analytics: Fully Explained (2018)"; Jun. 12, 2019, Retrieved from the Internet, p. 2-p. 5.

* cited by examiner

METHODS FOR CONTROLLING TRACKING ELEMENTS OF A WEB PAGE AND RELATED ELECTRONIC DEVICES

The present disclosure pertains to the field of communications technology and more specifically to security and privacy in Internet-based communications. The present disclosure relates to methods for controlling tracking elements of a web page and related electronic devices.

BACKGROUND

When a website wants to give users the choice to decline tracking by cookies and similar tracking technologies, the website needs to implement a technical function to hold back all cookies and similar tracking methods until the visitor has opted in, providing a so-called "prior consent". This is typically done by presenting the user with a popup on the user's initial visit to the website including information about the purpose of the trackers installed on the website by embedded tracking tags from third parties, and typically with an option to opt in or out of all or specific categories of cookies.

SUMMARY

As standard browser technology (and technical standards) provide no means to dynamically block the loading of certain tracking tags on basis of the individual user's consent (such as tracking tags that are setting cookies), a website owner needs to manually disable the tracking tags per default and implement a tool that enables tracking tags in accordance with the individual user's consent. The task of manually disabling tags is a burdensome and time consuming implementation and difficult since tracking tags are set from all kinds of embedded services and sources. Further, manual disabling of tracking tags does not permit to adapt sufficiently fast to changes in tracking tags and e.g. to new tracking tags embedded.

Accordingly, there is a need for electronic devices and methods for controlling tracking elements of a web page, which mitigate, alleviate or address the shortcomings existing and provide an advanced control of tracking technologies embedded in a web page as well as the ability to adapt to changes in tracking tags.

A method for controlling tracking elements of a web page is disclosed. The method is performed at an electronic device. The electronic device is configured to communicate to a server device and to a web server. The method comprises obtaining a web page address of the web page to connect to the web server. The method comprises transmitting a web page request to the web server based on the web page address. The method comprises receiving, from the web server, a web page response. The web page response comprises tracking elements. The web page response comprises a control tag configured to control tracking elements of the web page. The method comprises rendering the web page based on the web page response. Rendering the web page comprises invoking the control tag. Invoking the control tag comprises obtaining a first set of tracking tags of the web page.

Further, an electronic device is provided. The electronic device comprises a memory circuitry, a processor circuitry and an interface circuitry. The electronic device is configured to perform any of the methods disclosed herein.

It is an advantage of the present disclosure that it improves the controlling of tracking elements of a web page, such as automating task of disabling tracking tags that are setting cookies, so that the website owner is no longer required to do this manually. The disclosed technique can be deployed as part of an existing Consent Management Platform, used on websites by invoking the control tag embedded in the web page response, e.g. as script tag. Thereby the website owner only needs to embed the control tag to provide the users of the website with informed, prior consent and control of the tracking elements adapted to the prior consent. Further, the present technique permits to adapt fast (e.g. faster than manual disabling) to changes in tracking tags and e.g. to new tracking tags embedded. The disclosed technique allows for dynamically blocking the loading of tracking elements, e.g. tracking tags.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
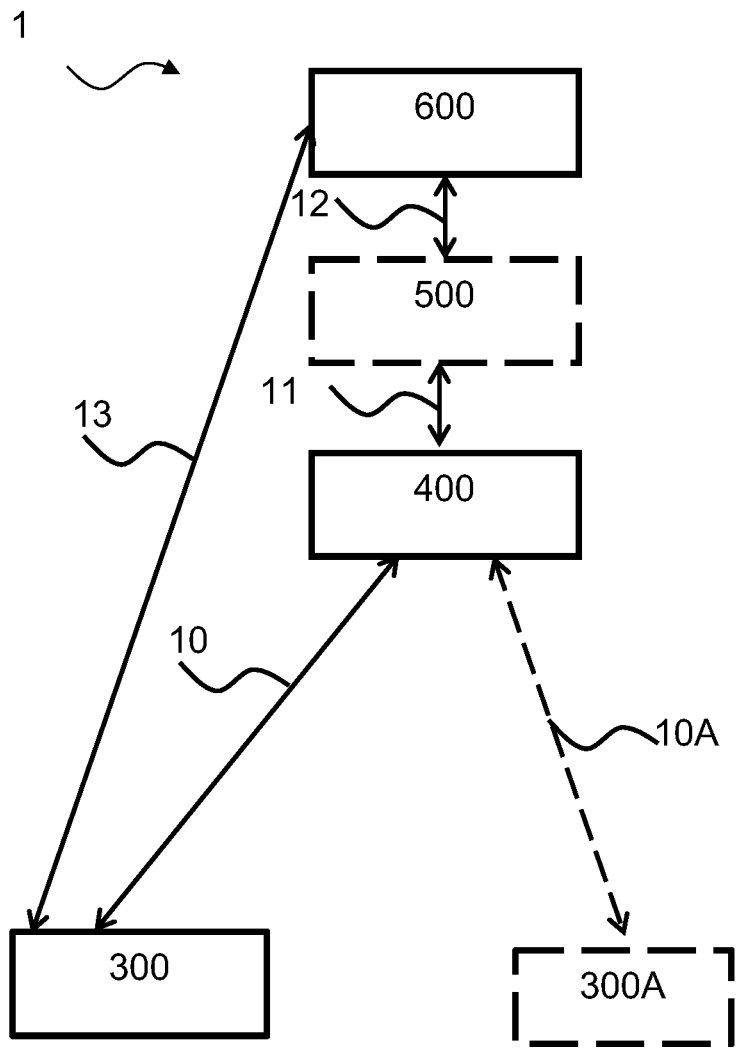
FIG. 1 is a diagram illustrating an exemplary communication system comprising an exemplary electronic device and an exemplary server device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Privacy may be seen as the right of individuals or users to determine when, how, and to what extent information related to themselves is monitored and/or reported to others.

One tracking technique to collect user information involves cookies, e.g., HTTP cookies (HyperText Transport Protocol). Cookies can be used to collect information about a user's action within a web site or for other purposes. This information is often collected and used without the knowledge or consent of the user of the web site.

Many governmental entities have considered regulating the use of cookies. For example, an e-commerce site might be forbidden to send cookies to a user unless there is full disclosure to the user about the purpose of each cookie. In that case, the e-commerce site would need to drastically reduce or completely eliminate their use of cookies.

However, external tags may be operated by 3rd party companies and there is no immediate way to document the tracking activity of these external tags on the webpage, which can be a risk in many cases, and lead to privacy violation. For example, even if a 3rd party is known to the website owner, there may be situations where a declared 3rd party gives access and/or provides opportunity for other parties that may not be known to the website owner to perform tracking activities. Such a chain of 3rd parties is impossible to document today.

An HTML logical structure builds a Document Object Model (DOM) and there may be multiple authors on the DOM, which are identified using the disclosed server device.

Recent legislation requires that prior consent of a user of a website is obtained and complied with.

The present disclosure provides methods and electronic devices that provide control over tracking elements. The disclosed technique may be seen as a privacy-enhancing technique, which supports in protecting user privacy. The disclosed technique limits the operations of the tracking elements.

A method for controlling tracking elements of a web page is disclosed. The method is performed at an electronic device. For example, the method may be performed in part using a web browser installed to run on the electronic device. The electronic device is configured to communicate to a server device and to a web server. The web server may be hosting the web page. The web page may form part of a website hosted by the web server.

The method optionally comprises requesting from the server device a first set of tracking tags associated with the web page. The server device is configured to detect, identify and store the first set of tracking tags, which are obtained in an initialization phase wherein the server device analyses the web page to detect and identify tracking tags of the web page and store the tracking tags as a first set of tracking tags associated with the web page. For example the server device may derive the first set by obtaining the web page address configured to connect to a web server, by establishing a controlled communication interface between the server device and the web server via a proxy server under the control of the server device, by transmitting, via the controlled communication interface, a web page request based on the web page address, by receiving, via the controlled communication interface, a web page response, by identifying, based on the web page response, a set of tracking tags including a first tracking tag and a second tracking tag, by deactivating all tracking tags of the set; and activating the first tracking tag (and subsequent tracking tag(s) one by one). In one or more embodiments, the server device may act as a web server, a file server, a content delivery network (CDN) server.

The term "tracking element" refers to an element of a web page, wherein the element is configured to track, monitor, and/or observe one or more activities of a user of the web page. The term "tracking element" can refer to an element of a web page, wherein the element is configured to report, to an external device, data based on an activity related to the web page. A tracking element is configured to carry out and/or deploy a tracking technique. A tracking element may comprise a tracking tag. Tracking technique may comprise one or more of: a cookie containing a unique identifier as value, pixel tracker(s) adapted to send information to a 3rd party server (e.g. allowing to send information without having a 3rd party tracking element detected), an indexed database (e.g. a database format built into a web browser, a local shared object (e.g. a flash local shared object), a ultra sound audio fingerprinting technique (e.g. adapted to recognize the user based on pattern, e.g. by playing a unique ultra sound pattern un-hearable by the user, so as to connect the additional personal devices of the user).

The method comprises obtaining, a web page address of the web page to connect to the web server. For example, the web page address is obtained from an input from a user of the electronic device, such as the user entering the URL of the web page into a web browser. Obtaining the webpage address may comprise receiving the web page address from a user (e.g. a user of the electronic device). The web page address may be associated to with a website. A web page may refer to a hypertext document associated with a resource on the World Wide Web, such a web address (e.g. a URL address, and/or an Internet Protocol (IP) address) associated with e.g. a website. The document may be written in HTML (hypertext mark-up language) and translated (e.g. rendered) by the web browser.

The method comprises transmitting, a web page request to the web server based on the web page address. The web page request is a network request to e.g. a domain on a web server (e.g. external to the architecture comprising the server device). For example, the electronic device instructs the web browser (e.g. installed on the server device) to transmit the web page request to, e.g. the web server hosting the web page.

The method comprises receiving, from the web server, a web page response. The web page response comprises tracking elements, wherein the tracking elements comprise tracking tags. The web page response comprises a control tag configured to control tracking elements of the web page. The web page response may comprise a response in HTML, such as an HTML response. For example, the control tag may be embedded, in a source code of the web page, the control tag configured to control tracking elements of the web page. For example, the control tag may be included, in a source code of the web page, the control tag configured to control tracking elements of the web page. For example, the control tag can be embedded by the website owner including the control tag in the text forming the source code of the web page. For example, the control tag is preferably embedded in the front end of source code, such as before any tracking elements. For example, the web site owner may embed the control tag as a first script-tag in the web server's HTML response, e.g. by embedding the control tag in the primary layout template used by the website on all page views.

A control tag disclosed herein is configured to control the tracking elements of the web page for protecting the user of the web page, e.g. against non-consented tracking elements. A control tag disclosed herein is configured to control the tracking elements to limit, e.g. to stop, to deactivate, to block, to disallow tracking elements which have not obtained approval by the user, e.g. which are part of a tracking tag category which has not obtained approval by the user. It may be appreciated that the control tag is never deactivated. A control tag disclosed herein is configured to control permission of the tracking elements. The control tag may be seen as an element of control over the tracking elements, e.g. tracking tags. For example, the control tag is capable of deactivating any tracking tag. For example, the control tag is capable of activating only the permitted tracking tags. The control tag is not a tracking tag, in that the control tag does not track, nor monitor, nor observe one or more activities of a user of the web page. The control tag is configured to track the tracking elements and handle/manage the tracking elements, e.g. tracking tags, to comply with or follow approval or acceptance by the user. The control tag is configured to protect against tracking by third parties, e.g.

third party tracking tags. The control tag is configured to deactivate tracking elements. The control tag may be seen as a controller of the tracking elements, e.g. the tracking tags.

The method comprises rendering the web page based on the web page response. For example, when the web browser loads the webpage, the web browser running on the electronic device renders the web page based on the web page response.

Rendering the web page comprises invoking the control tag (e.g. the control tag that has been embedded in the web page). For example, invoking the control tag comprises deploying the control tag, such as launching the control tag, such as triggering execution of the control tag by a browser running on the electronic device. When a user loads the webpage (e.g. website) in a web browser of the electronic device, the control tag is the first tag to be loaded before the rest of the tracking tags that may constitute the structure and content of the web page, the so-called Document Object Model (DOM).

Invoking the control tag comprises obtaining a first set of tracking tags of the web page (e.g. from the server device). Obtaining the first set may comprises receiving and/or retrieving the first set from the server device, and/or from a memory circuitry of the electronic (which may have the first set stored thereon). For example, the first set of tracking tags may be determined at initialization phase (e.g. S102 of FIG. 2) where the web page is initially scanned by the server device and the first set is stored at the server device for later retrieval by the electronic device. For example, the server device scans the website to identify the first set of tracking tags that are setting cookies on the website. For example, a scan of the web page may be regularly performed by the server device to update the first set of tracking tags identified. Optionally, the invoking of the control tag may trigger an update of the first set. Optionally, an update of the first set may be triggered by invoking the control tag by user input from the website owner, e.g. via a dashboard interfacing server device.

Optionally, invoking the control tag comprises deactivating one or more tracking tags of the first set of tracking tags. Optionally, invoking the control tag comprises deactivating all tracking tags of the first set.

In one or more example methods, the tracking tag is characterized by one or more tracking attributes comprising one or more of: a name attribute, an identifier attribute, a tracking type attribute, a code line number attribute, an original external source attribute, an attribute indicative of an IP number of a third party domain and a domain attribute.

In one or more example methods, invoking the control tag comprises identifying, based on the web page response (e.g. based on a source code associated with the web page response), a second set of tracking tags. In one or more example methods, identifying, based on the web page response, the second set of tracking tags comprises parsing a source code of the web page (e.g. of the web page response) to obtain the second set. Parsing the source code may be performed based on the web page response. In other words, the second set of tracking tags may be obtained from parsing the source code. For example, parsing the source code may be performed by a parsing technique, e.g. using parsing JavaScript function, e.g. using a global MutationObserver which parses tracking tags as the tracking tags are created in the DOM.

In one or more example methods, invoking the control tag comprises deactivating one or more tracking tags of the second set of tracking tags (e.g. all tracking tags of the second set). For example, all tracking tags of the second set (e.g. tracking tags that theoretically can set cookies, e.g. SCRIPT, (FRAME and IMG tags), are deactivated when parsing the source code for all tracking tags. In one or more example methods, invoking the control tag comprises deactivating one or more tracking tags of the second set of tracking tags prior to obtaining the first set of tracking tags from the server device.

In one or more example methods, invoking the control tag comprises deactivating one or more tracking tags of the second set of tracking tags (e.g. prior to obtaining the first set).

In one or more example methods, invoking the control tag comprises determining, based on the first set and the second set, a third set of tracking tags including a first tracking tag and a second tracking tag. In one or more example methods, determining, based on the first set and the second set, the third set of tracking tags comprises comparing the first set and the second set, and including, in the third set, one or more tracking tags present in the first set and the second set. In other words, each tracking tag of the second set is for example evaluated against (e.g. compared) tracking tags of the first set which is obtained by invoking the control tag. For example, when a tracking tag of the second set matches one or more of the tracking tags of the first set (e.g. an identifier tracking tag of the second set matches an identifier of a tracking tag registered in the first set), the corresponding tag of the second set is included in the third set. For example, an HTML tag may include a customizable identifier attribute (so called a unique identifier "ID"). For example, the first set of tracking tags comprise unique identifiers associated with their respective tracking tags to identify/recognize a given tracking tag when parsing/comparing tracking tags of the first set with tracking tags of the second set. Example of identifiers comprises a source URL (SRC-URL), a source (SRC) domain, a tag code and/or a hashed version of the tag code. The third set of tracking tags may be seen as a set that includes tracking tags that are to be deactivated, for example right away, for example until consent is obtained.

In one or more example methods, invoking the control tag comprises deactivating one or more tracking tags of the third set of tracking tags (e.g. all tracking tags of the third set). For example, the tracking tags of the third set are deactivated because they are in the first set (i.e. tracking tags identified by the server device as tracking tags which are setting cookies) and in the second set (i.e. tracking tags identified by the electronic device as present in the parsed source code).

Advantageously, this allows for forward adaptation of the disclosed technique to tracking tags which may have been added to the web page.

In one or more example methods, deactivating the one or more tracking tags of the third set of tracking tags comprises deactivating the one or more tracking tags of the third set according to the one or more control parameters obtained. For example, one or more tracking tags of the third set may be deactivated when the one or more tracking tags of the third set correspond to a tracking tag category indicated as not accepted by the user by the one or more control parameters. The control tag may not form part of the first set. The control tag may not form part of the third set. The third set may comprise a first tracking tag and/or a second tracking tag. In one or more example methods, deactivating the one or more tracking tags of the third set of tracking tags comprises modifying a first type attribute and/or a first source attribute of the first tracking tag. For example, the one or more tracking tags of the third set are blocked, disabled, and/or deactivated in that the one or more tracking tags of the third set are stopped from invoking access to any external source. For example, the tracking tags of the third set are automatically and on-the-fly blocked by the electronic device. A tracking tag may have one or more attributes, such as a type attributed and/or a source attribute. For example, the first type attribute may be modified by changing the first type attribute to an arbitrary type attribute (e.g. different from any of "application/javascript" and "application/ecmascript"), such as "text/plain" (in order to e.g. block or deactivate tracking tags of the type SCRIPT).

In one or more example methods, modifying the first source attribute comprises identifying an original external source attribute associated with the first tracking tag and replacing the original external source attribute with the first source attribute which excludes the original external source. For example, the first source attribute may be modified by changing the first source attribute to an arbitrary source attribute, such as "DATA-SRC" (e.g. renaming the "SRC"-attribute to "DATA-SRC" on tracking tags that rely on the SRC-attribute, e.g.: SCRIPT, IMAGE (IMG) and/or (FRAME).

In one or more example methods, deactivation of tracking tags of one or more of the first, second, and third set may be performed before a corresponding deactivated tracking tag is inserted in the DOM.

In an illustrative example where the present technique is applied, the electronic device deactivates all tracking tags of the second set (e.g. tracking tags that theoretically can set cookies, e.g. SCRIPT, (FRAME and IMG tags) when the second set is obtained by parsing the source code to identify all tags of the second set. Then, for example, when the first set has been downloaded by the electronic device, all tracking tags of the second set which are not in the first set are activated (for example as these tags are not setting cookies while tracking tags that are in the first set are associated with cookies). Then, tracking tags of the third set (i.e. which are in both in the first. set and in the second set) that are accepted by the user's consent (e.g. indicated in the one or more control parameters obtained) are activated by the electronic device. The rest of tags of the third set remain deactivated.

In one or more example methods, one or more tracking tags of the second set which are not in the first set are not deactivated but re-activated. These may be tracking tags for the well-functioning of the web page.

In one or more example methods, deactivating the one or more tracking tags of the third set of tracking tags comprises modifying a second type attribute and/or a second source attribute of the second tracking tag. For example, the second type attribute may be modified by changing the second type attribute to "text/plain" (in order to e.g. block or deactivate tracking tags of the type SCRIPT. In one or more example methods, modifying the second source attribute comprises identifying an original external source attribute associated with the second tracking tag and replacing the original external source attribute with the second source attribute which excludes the original external source. For example, the second source attribute may be modified by changing the first source attribute to "DATA-SRC" (e.g. renaming the "SRC"-attribute to "DATA-SRC").

In one or more example methods, the method comprises obtaining one or more control parameters. Obtaining the one or more control parameters may comprise obtaining one or more default control parameters, e.g. from the memory circuitry of the electronic device. Obtaining the one or more control parameters may comprise obtaining the one or more control parameters in accordance with the user consent and/or the one or more control parameters accepted by the user (e.g. via the interface of the electronic device, e.g. graphical user interface). In one or more example methods, the one or more control parameters are indicative of one or more tracking tag categories accepted by the user. For example, obtaining the one or more control parameters may be seen as obtaining consent with respect to the identified tracking tags of any of one or more of the first set, the second set and the third set. For example, obtaining the one or more control parameters may comprise displaying on the interface of the electronic device (e.g. on a display of the interface) one or more cookies associated with a corresponding tracking tag of any of the sets. For example, obtaining the one or more control parameters may comprise displaying on the interface of the electronic device (e.g. on a display of the interface) a tag category of the respective tracking tag(s) (e.g. category: strictly necessary cookies (for well-functioning of the web page), user preference, statistics, marketing cookies, and/or unclassified).

For example, when the user's consent is obtained (e.g. loaded from a consent cookie from a previous consent submission), the electronic device automatically activates the tags of the third set that uses one or more of the cookie categories or tracking tag category that the user has accepted when submitting the consent. In one or more example methods, the method comprises activating one or more tracking tags according to the one or more control parameters (e.g. one or more tracking tags of the third set). In one or more example methods, activating the first tracking tag comprises re-modifying the first type attribute to the original type attribute and/or the first source attribute to the original external source attribute. For example, SCRIPT-tags are re-activated by changing the "TYPE"-attribute to "text/javascript" while other tags as IMG and IFRAME are re-activated by renaming the source attribute "DATA-SRC" back to "SRC". Activating a tracking tag may be seen as reverting the tracking attribute(s) back to original attribute(s). This may be applied to the second tracking tag.

Further, a computer readable storage medium storing one or more programs is provided. The one or more programs comprise instructions, which when executed by an electronic device cause the electronic device to perform any of the methods disclosed herein.

Further, an electronic device is provided. The electronic device comprises a memory module, a processor module and an interface module. The electronic device is configured to perform any of the methods disclosed herein.

The present disclosure provides a method performed by a website owner device for controlling tracking elements of a web page owned by the website owner; the method comprises embedding in the web page a control tag configured to control tracking elements of the web page. For example, embedding in the web page the control tag configured to control tracking elements of the web page may comprise embedding, in a source code of the web page, the control tag configured to control tracking elements of the web page. For example, embedding in the web page the control tag configured to control tracking elements of the web page may comprise including, in a source code of the web page, the control tag configured to control tracking elements of the web page. For example, the control tag can be embedded by including the control tag in the text forming the source code of the web page. For example, the control tag is preferably embedded in the front end of source code, such as before any tracking elements. For example, the web site owner may embed the control tag as a first script-tag in the web server's HTML response, e.g. by embedding the control tag in the primary layout template used by the website on all page views.

The figures are schematic and simplified for clarity, and they merely show details which aid understanding the disclosure, while other details have been left out. Throughout, the same reference numerals are used for identical or corresponding parts.

FIG. 1 is a diagram illustrating an exemplary communication system 1 comprising an exemplary server device 400, (optionally an exemplary proxy server 500), an exemplary web server 600 and an exemplary electronic device 300 according to this disclosure.

As discussed in detail herein, the present disclosure relates to an Internet based communication system 1 comprising wired communication system and/or wireless communication system.

A server device 400 disclosed herein refers to a device configured to perform detection of tracking tags of a first set. For example, the server device 400 is configured to control the proxy server 500. Optionally, the server device 400 and the proxy server 500 may form part of the same network architecture. Optionally, the server device 400 comprises the proxy server 500.

The communication system 1 described herein may comprise one or more electronic devices 300, 300A, and/or one or more server device 400, and/or one or more web servers 600, and/or one or more proxy servers 500.

An electronic device may refer to as a computing device configured to be used by a user. An electronic device may comprise a user device, a portable electronic device, such as a laptop, a tablet, a desktop, and/or a wearable device.

The electronic device 300, 300A may be configured to communicate with the server device 400 via a link (wired and/or wireless) 10, 10A.

The server device 400 may be configured to communicate with the proxy server 500 via a link (wired and/or wireless) 11.

The server device 400 may be configured to communicate with the web server 600 via proxy server via a link (wired and/or wireless) 11 between the server device 400 and the proxy server 500, and via a link 12 between the proxy server 500 and the web server 600.

The electronic device 300, 300A is configured to communicate with the web server 600 via a link (wired and/or wireless) 13.

Figure 2:
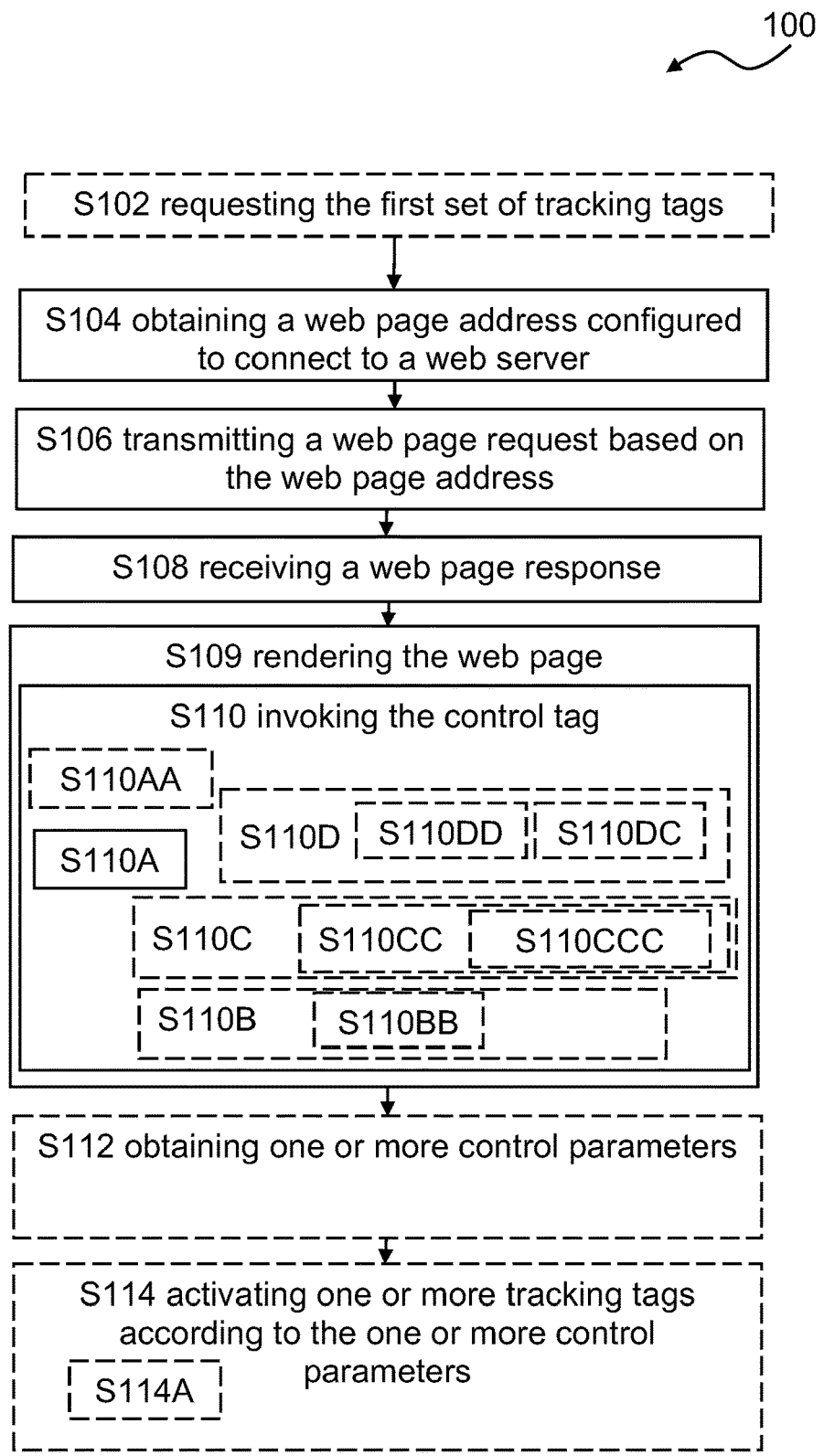
FIG. 2 is a flow-chart illustrating an exemplary method, performed by an electronic device, for controlling tracking elements of a web page according to this disclosure.

FIG. 2 shows a flow diagram of an exemplary method 100 for controlling tracking elements of a web page is disclosed. The method is performed at an electronic device (such as an electronic device disclosed herein, electronic device 300 of FIGS. 1 and 4). For example, the method 100 may be performed in part using a web browser installed to run on the electronic device. The electronic device is configured to communicate to a server device (e.g. server device 400 of FIG. 1) and to a web server (e.g. web server 600 of FIG. 1). The web server may be hosting the web page. The web page may form part of a website hosted by the web server.

The method optionally comprises requesting S102 from the server device a first set of tracking tags associated with the web page. The server device is configured to detect, identify and store the first set of tracking tags, which are obtained in an initialization phase wherein the server device analyses the web page to detect and identify tracking tags of the web page and store the tracking tags as a first set of tracking tags associated with the web page. For example the server device may derive the first set by obtaining the web page address configured to connect to a web server, by establishing a controlled communication interface between the server device and the web server via a proxy server under the control of the server device, by transmitting, via the controlled communication interface, a web page request based on the web page address, by receiving, via the controlled communication interface, a web page response, by identifying, based on the web page response, a set of tracking tags including a first tracking tag and a second tracking tag, by deactivating all tracking tags of the set; and activating the first tracking tag (and subsequent tracking tag(s) one by one). In one or more embodiments, the server device may act as a web server, a file server, a content delivery network (CDN) server.

The method comprises obtaining S104, a web page address of the web page to connect to the web server. For example, the web page address is obtained from an input from a user of the electronic device, such as the user entering the URL of the web page into a web browser. Obtaining S104 the webpage address may comprise receiving the web page address from a user (e.g. a user of the electronic device). The web page address may be associated to with a website. A web page may refer to a hypertext document associated with a resource on the World Wide Web, such a web address (e.g. a URL address, and/or an Internet Protocol (IP) address) associated with e.g. a website. The document may be written in HTML (hypertext mark-up language) and translated (e.g. rendered) by the web browser.

The method comprises transmitting S106, a web page request to the web server based on the web page address. The web page request is a network request to e.g. a domain on a web server (e.g. external to the architecture comprising the server device). For example, the electronic device instructs the web browser (e.g. installed on the server device) to transmit the web page request to, e.g. the web server hosting the web page.

The method comprises receiving S108, from the web server, a web page response. The web page response comprises tracking elements, e.g. tracking tags. The web page response comprises a control tag configured to control tracking elements of the web page. The web page response may comprise a response in HTML, such as an HTML response.

The control tag is configured to control the tracking elements of the web page, e.g. for protecting the user of the web page, e.g. against non-consented tracking elements. In other words, the control tag is configured to control the tracking elements to limit, e.g. to stop, to deactivate, to block, to disallow tracking elements which have not obtained approval by the user, e.g. which are part of a tracking tag category which has not obtained approval by the user. It may be appreciated that the control tag is never deactivated. The control tag may be seen as an element of control over the tracking elements, e.g. tracking tags. For example, the control tag is capable of deactivating any tracking tag. For example, the control tag is capable of activating only the permitted tracking tags. The control tag is not a tracking tag, in that the control tag does not track, nor monitor, nor observe one or more activities of a user of the web page. The control tag is configured to track the tracking elements and handle/manage the tracking elements, e.g. tracking tags, to comply with or follow approval or acceptance by the user. The control tag is configured to protect against tracking by third parties, e.g. third party tracking tags. The control tag is configured to deactivate tracking elements.

For example, the control tag may be embedded, in a source code of the web page, the control tag configured to control tracking elements of the web page. For example, the control tag may be included, in a source code of the web page, the control tag configured to control tracking elements of the web page. For example, the control tag can be embedded by the website owner including the control tag in the text forming the source code of the web page. For example, the control tag is preferably embedded in the front end of source code, such as before any tracking elements. For example, the web site owner may embed the control tag as a first script-tag in the web server's HTML response, e.g. by embedding the control tag in the primary layout template used by the website on all page views.

The method comprises rendering S109 the web page based on the web page response. For example, when the web browser loads the webpage, the web browser running on the electronic device renders the web page based on the web page response.

Rendering S109 the web page comprises invoking S110 the control tag (e.g. the control tag that has been embedded in the web page). For example, invoking S110 the control tag comprises deploying the control tag, such as launching the control tag, such as triggering execution of the control tag by a browser running on the electronic device. When a user loads the webpage (e.g. website) in a web browser of the electronic device, the control tag is the first tag to be loaded before the rest of the tracking tags that may constitute the structure and content of the web page, the so-called Document Object Model (DOM).

Invoking S110 the control tag comprises obtaining S110A a first set of tracking tags of the web page (e.g. from the server device). Obtaining S110A the first set may comprises receiving and/or retrieving the first set from the server device, and/or from a memory circuitry of the electronic (which may have the first set stored thereon). For example, the first set of tracking tags may be determined at initialization phase (e.g. S102) where the web page is initially scanned by the server device and the first set is stored at the server device for later retrieval by the electronic device. For example, the server device scans the website to identify the first set of tracking tags that are setting cookies on the website. For example, a scan of the web page may be regularly performed by the server device to update the first set of tracking tags identified. Optionally, the invoking of the control tag may trigger an update of the first set. Optionally, an update of the first may be triggered by invoking the control tag by user input from the website owner, e.g. via a dashboard interfacing server device.

Optionally, invoking the control tag comprises deactivating one or more tracking tags of the first set of tracking tags.

For example, all tracking tags (of any one or more of the first set, the second set, and the third set) may be deactivated for example when the user has not submitted consent or has opted out of all tracking techniques detected.

In one or more example methods, invoking S110 the control tag comprises identifying S110B, based on the web page response, a second set of tracking tags. In one or more example methods, identifying S110B, based on the web page response, the second set of tracking tags comprises parsing S110BB a source code of the web page to obtain the second set. Parsing S110B the source code may be performed based on the web page response. In other words, the second set of tracking tags can be obtained from parsing the source code. For example, parsing the source code may be performed by a parsing technique, e.g. using parsing JavaScript function, e.g. using a global MutationObserver which parses tracking tags as the tracking tags are created in the DOM.

In one or more example methods, invoking S110 the control tag comprises deactivating S110AA one or more tracking tags of the second set of tracking tags (e.g. prior to obtaining S110A the first set). For example, deactivating S110AA one or more tracking tags of the second set of tracking tags (e.g. prior to obtaining S110A the first set) comprises deactivating all the tracking tags of the second set. For example, all tracking tags of the second set (e.g. tracking tags that theoretically can set cookies, e.g. SCRIPT, (FRAME and IMG tags), are deactivated when parsing the source code for all tracking tags. In one or more example methods, invoking the control tag comprises deactivating one or more tracking tags of the second set of tracking tags prior to obtaining the first set of tracking tags from the server device.

In one or more example methods, invoking S110 the control tag comprises determining S110C, based on the first set and the second set, a third set of tracking tags including a first tracking tag and a second tracking tag. In one or more example methods, determining S110C, based on the first set and the second set, the third set of tracking tags comprises comparing S110CC the first set and the second set, and including S110CCC, in the third set, one or more tracking tags present in both the first set and the second set. In other words, each tracking tag of the second set is for example evaluated against (e.g. compared) tracking tags of the first set which is obtained by invoking the control tag. For example, when a tracking tag of the second set matches one or more of the tracking tags of the first set (e.g. an identifier attribute of a tracking tag of the second set matches an identifier attribute of a tracking tag registered in the first set), the corresponding tag of the second set is included in the third set. For example, an HTML tag may include a customizable identifier attribute (so called a unique identifier "ID"). For example, the first set of tracking tags comprises unique identifiers associated with their respective tracking tags to identify/recognize a given tracking tag when parsing/comparing tracking tags of the first set with tracking tags of the second set. Example of identifiers comprises a source URL (SRC-URL), a source (SRC) domain, a tag code and/or a hashed version of the tag code. The third set of tracking tags may be seen as a set that includes tracking tags that are to be deactivated, for example right away, for example until consent is obtained.

In one or more example methods, invoking S110 the control tag comprises deactivating S110D one or more tracking tags of the third set of tracking tags. In one or more example methods, deactivating S110D the one or more tracking tags of the third set of tracking tags comprises deactivating the one or more tracking tags of the third set according to the one or more control parameters obtained in S112. In one or more example methods, deactivating S110D the one or more tracking tags of the third set of tracking tags comprises modifying S110DC a first type attribute and/or a first source attribute of the first tracking tag. In one or more example methods, deactivating S110D the one or more tracking tags of the third set of tracking tags comprises modifying S110DD a second type attribute and/or a second source attribute of the second tracking tag. For example, the first type attribute may be modified by changing the first type attribute to an arbitrary type attribute (e.g. different from any of "application/javascript" and "application/ecmascript"), such as "text/plain" (in order to e.g. block or deactivate tracking tags of the type SCRIPT).

In one or more example methods, modifying S110DC the first source attribute comprises identifying an original external source attribute associated with the first tracking tag and replacing the original external source attribute with the first source attribute which excludes the original external source. For example, the first source attribute may be modified by changing the first source attribute to an arbitrary source attribute, such as "DATA-SRC" (e.g. renaming the "SRC"-attribute to "DATA-SRC" on tracking tags that rely on the SRC-attribute, e.g.: SCRIPT, IMAGE (IMG) and/or (FRAME). For example, the arbitrary source attribute may be selected to be a void source attribute.

In one or more example methods, the method 100 comprises obtaining S112 one or more control parameters. Obtaining S112 the one or more control parameters may comprise obtaining one or more default control parameters, e.g. from the memory circuitry of the electronic device. Obtaining S112 the one or more control parameters may comprise obtaining the one or more control parameters in accordance with the user consent and/or the one or more control parameters accepted by the user (e.g. via the interface of the electronic device, e.g. graphical user interface). In one or more example methods, the one or more control parameters are indicative of one or more tracking tag categories accepted by the user.

In one or more example methods, the method 100 comprises activating S114 one or more tracking tags according to the one or more control parameters. Activating S114 one or more tracking tags according to the one or more control parameters may comprise activating one or more tracking tags of the third set according to the one or more control parameters. For example, when the user's consent is obtained (e.g. loaded from a consent cookie from a previous consent submission), the electronic device automatically activates the tags of the third set that uses one or more of the cookie categories or tracking tag category that the user has accepted when submitting the consent. In one or more example methods, activating the first tracking tag comprises re-modifying S114A the first type attribute to the original type attribute and/or the first source attribute to the original external source attribute. For example, SCRIPT-tags are re-activated by changing the "TYPE"-attribute to "text/javascript" while other tags as IMG and (FRAME are re-activated by renaming the source attribute "DATA-SRC" back to "SRC". Activating a tracking tag may be seen as reverting the tracking attribute(s) back to original attribute(s). This may be applied to the second tracking tag and/or any subsequent tracking tag of the third set according to the one or more control parameters.

In one or more examples, the method 100 comprises deactivating one or more tracking tags according to the one or more control parameters.

In one or more example methods, activating S114 the first tracking tag comprises re-modifying S114A the first source attribute to the original external source attribute.

In one or more example methods, the tracking tag is characterized by one or more tracking attributes comprising one or more of: a name attribute, an identifier attribute, a type attribute, a code line number attribute, an original external source attribute, an attribute indicative of an IP number of a third party domain and a domain attribute.

Figure 3:
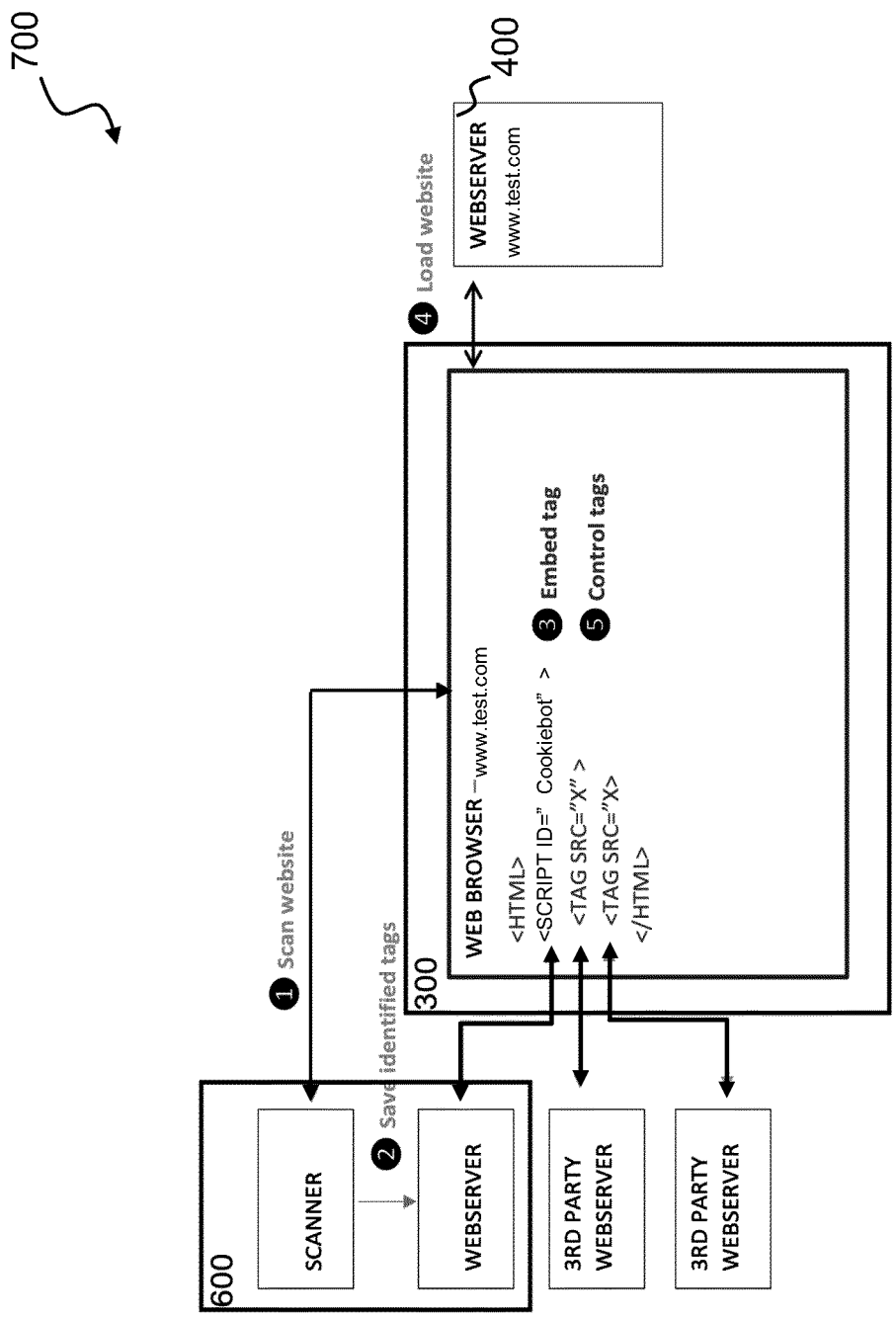
FIG. 3 is a diagram illustrating an example process according to the present disclosure.

FIG. 3 is a diagram 700 illustrating an example process according to the present disclosure. The diagram 700 illustrates an example where the disclosed technique is applied.

At step 1 for example, a server device 600 scans a website (in this example, www.test.com) to identify a first set of tracking tags that are setting cookies on the one or more webpages of the website. This may be performed as part of an initialization step and/or triggered by a website owner request and/or other requests.

At step 2 for example: When a scan is completed by a server device 600, the first set of tracking tags (e.g. a list of the identified tags) is stored on a memory unit of the server device 600 (that may act as a webserver that is also providing the Consent Management script on customers' websites through the control tag). Tracking tags of the first set are uniquely identified by an identifier attribute e.g. a tag-code itself, a hashed value of the code, and/or the URL from which the tracking tag is loaded (e.g. full URL or fragment of URL). A tracking tag can be any kind of HTML tag that is able to set cookies on the user's browser, e.g. SCRIPT, IMG and IFRAME tags. For each tracking tag of the first set, a type attribute (e.g. defining which types of cookies the tag is deploying) may be associated with each corresponding tracking tag of the first set and stored or saved as part of the set on a webserver part of the server device 600. In other words, the identified tags of the first set are saved on a webserver part of the server device 600 so as to be accessible to the electronic device 300.

A step 3 for example: To enable the control tag disclosed herein (for example acting as a Tag Blocker on the website), the website owner embeds the control tag as the first script-tag in the webserver's HTML response, typically by embedding the control tag in the primary layout template used by the website on all page views.

At step 4 for example: When the electronic device 300 loads the corresponding webpage of the website in a web browser, the control tag is the first to load possibly before or followed by the rest of the HTML tags that constitutes the structure and content on a given web page, the so-called Document Object Model (DOM).

At step 5 for example: When the control tag is loaded or invoked, the control tag deploys a parser, such as a global MutationObserver, which parses all other tracking tags as they are created in the DOM. All tracking tags identified by the parser are of a second set, and are optionally deactivated right away or later by the control tag. Each tracking tag parsed (i.e. of the second set disclosed herein) is evaluated against the tracking tags of the first set which is loaded with the control tag. When a tracking tag of the second set matches one or more of the tracking tags registered in the first set, the matching tracking tag is a tracking tag of a third set of tracking tags and automatically and in real-time (on-the-fly) blocked and/or deactivated by the control tag disclosed herein. For example, SCRIPT-tags are blocked by changing the tag "TYPE"-attribute to e.g. "text/plain", other tags as IMG and IFRAME are blocked by renaming the "SRC"-attribute to e.g. "DATA-SRC" before the tag is inserted in the DOM.

When the user's consent is submitted (or loaded from a consent cookie from a previous consent submission) via the electronic device 300, the electronic device 300 automatically activates the tags of the third set that uses one or more of the cookie categories that the user has accepted when submitting the consent. For example, the relevant SCRIPT-tags are re-activated by control tag by changing the "TYPE"-attribute to "text/javascript" while other tags as IMG and IFRAME are re-activated by renaming the tag-attribute "DATA-SRC" back to "SRC".

Figure 4:
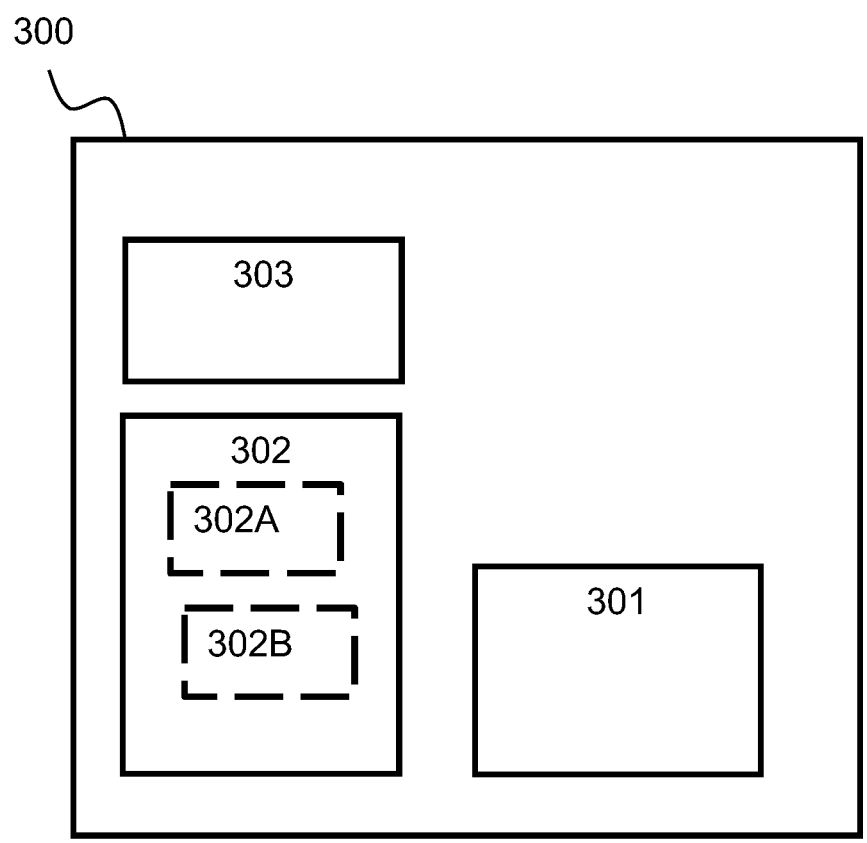
FIG. 4 is a block diagram illustrating an exemplary electronic device according to this disclosure.

FIG. 4 shows a block diagram of an exemplary electronic device 300 according to the disclosure. The exemplary electronic device 300 comprises a memory circuitry 301, a processor circuitry 302 and an interface circuitry 303. The exemplary electronic device 300 is configured to perform any of the methods disclosed in FIG. 2.

The exemplary electronic device 300 is configured to communicate, via the interface circuitry 303, with a web server and with a server device. The processor circuitry 302 may be configured to run a web browser 302A and/or a renderer 302B.

The electronic device 300 is configured to obtain, a web page address of the web page to connect to the web server (see S104 of FIG. 2).

The electronic device 300 is configured to transmit, via the interface circuitry 303, a web page request to the web server based on the web page address (see S106 of FIG. 2).

The electronic device 300 is configured to receive, via the interface circuitry 303, from the web server, a web page response, wherein the web page response comprises a control tag configured to control tracking elements of the web page (see S108 of FIG. 2).

The electronic device 300 is configured to render, via the renderer 302B, the web page based on the web page response (see S109 of FIG. 2).

The electronic device 300 is configured to render the web page by invoking (S110) the control tag. Invoking (S110) the control tag comprises obtaining (S110A) a first set of tracking tags of the web page (e.g. from the server device).

The processor circuitry 302 is optionally configured to perform any of the operations disclosed in FIG. 2 (e.g. S110B, S102, S110BB, S110C, S110CC, S110CCC, S110D, S110DD, S110DC, S112, S114, S114A). The operations of the electronic device 300 may be embodied in the form of executable logic routines (e.g., lines of code, software programs, etc.) that are stored on a non-transitory computer readable medium (e.g., the memory circuitry 301) and are executed by the processor circuitry 302).

Furthermore, the operations of the electronic device 300 may be considered a method that the electronic device 300 is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 4). The memory circuitry 301 is considered a non-transitory computer readable medium.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-4 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

The invention claimed is:

1. A method, performed at an electronic device, for controlling tracking elements of a web page, wherein the electronic device is configured to communicate to a server device and to a web server associated with the web page, the method comprising:
   obtaining a web page address of the web page to connect to the web server;
   transmitting a web page request to the web server based on the web page address;
   receiving, from the web server, a web page response, wherein the web page response comprises the tracking elements configured to monitor one or more activities of a user of the web page, wherein the tracking elements comprise tracking tags;

wherein the web page response comprises a control tag configured to control permission of the tracking elements of the web page to protect against tracking; and rendering the web page based on the web page response; wherein rendering the web page comprises invoking the control tag; and wherein invoking the control tag comprises:

obtaining a first set of tracking tags of the web page;

identifying, based on the web page response, a second set of tracking tags of the web page;

determining, based on the first set and the second set of tracking tags, a third set of tracking tags of the web page including a first tracking tag and a second tracking tag; and deactivating one or more tracking tags of the third set of tracking tags and/or one or more tracking tags of the second set of tracking tags;

wherein deactivating the one or more tracking tags of the third set of tracking tags comprises:

modifying a first type attribute and/or a first source attribute of the first tracking tag; and modifying a second type attribute and/or a second source attribute of the second tracking tag.

2. The method according to claim 1, the method comprising obtaining one or more control parameters.

3. The method according to claim 2, wherein the one or more control parameters are indicative of one or more tracking tag categories accepted by the user.

4. The method according to claim 2, the method comprising activating one or more tracking tags of the third set of tracking tags according to the one or more control parameters.

5. The method according to claim 4, wherein activating the first tracking tag comprises re-modifying the first source attribute to the original external source attribute.

6. The method according to claim 1, the method comprising requesting the first set of tracking tags of the web page.

7. The method according to claim 1, wherein identifying, based on the web page response, the second set of tracking tags comprises parsing a source code of the web page to obtain the second set of tracking tags.

8. The method according to claim 1, wherein determining, based on the first set and the second set of tracking tags, the third set of tracking tags comprises comparing the first set and the second set of tracking tags, and including, in the third set of tracking tags, one or more tracking tags present in both the first set and the second set of tracking tags.

9. The method according to claim 1, wherein modifying the first source attribute comprises identifying an original external source attribute associated with the first tracking tag and replacing the original external source attribute with the first source attribute which excludes the original external source.

10. The method according to claim 1, wherein the tracking tag is characterized by one or more tracking attributes comprising one or more of: a name attribute, an identifier attribute, a type attribute, a code line number attribute, an original external source attribute, an attribute indicative of an IP number of a third party domain, and a domain attribute.

11. A non-transitory computer readable storage medium storing one or more programs, the one or more programs comprising instructions, which when executed by an electronic device cause the electronic device to perform the method of claim 1.

12. An electronic device comprising a memory circuitry, a processor circuitry, and an interface circuitry, wherein the electronic device is configured to perform the method of claim 1.

* * * * *